US007411768B2

(12) United States Patent
Sells

(10) Patent No.: US 7,411,768 B2
(45) Date of Patent: Aug. 12, 2008

(54) LOW-LOSS RECTIFIER WITH SHOOT-THROUGH CURRENT PROTECTION

(75) Inventor: Troy Woodrow Sells, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 267 days.

(21) Appl. No.: 11/442,843

(22) Filed: May 30, 2006

(65) Prior Publication Data

US 2007/0279821 A1  Dec. 6, 2007

(51) Int. Cl.
*H02H 3/26* (2006.01)
*H02B 1/24* (2006.01)
(52) U.S. Cl. .......................... 361/77; 361/246; 307/127
(58) Field of Classification Search .................. 361/77, 361/245, 246; 307/127; 363/132
See application file for complete search history.

(56) References Cited

U.S. PATENT DOCUMENTS

| 3,839,679 | A | * | 10/1974 | Hughes ...................... 327/336 |
| 4,139,880 | A | | 2/1979 | Ulmer et al. |
| 4,331,994 | A | | 5/1982 | Wirth |
| 4,423,456 | A | | 12/1983 | Zaidenweber |
| 4,616,305 | A | * | 10/1986 | Damiano et al. ............ 363/132 |
| 5,623,550 | A | | 4/1997 | Killion |
| 5,870,031 | A | | 2/1999 | Kaiser et al. |
| 5,991,182 | A | | 11/1999 | Novac et al. |
| 6,380,721 | B2 | * | 4/2002 | Pattamatta et al. .......... 323/269 |
| 2004/0251884 | A1 | * | 12/2004 | Steffie et al. ................. 323/282 |
| 2007/0115706 | A1 | * | 5/2007 | Sells ........................... 363/132 |
| 2007/0257644 | A1 | * | 11/2007 | McLeod ...................... 323/273 |

* cited by examiner

*Primary Examiner*—Thuy Vinh Tran
(74) *Attorney, Agent, or Firm*—Darby & Darby; Robert J. Sacco

(57) ABSTRACT

A transistor active bridge circuit (400) rectifies domestic AC mains (for example, 120V, 60 Hz) and/or foreign AC mains (for example, 230V, 50 Hz) with low power loss. The circuit includes first and second field effect transistors (102, 104) of a first channel type, and third and fourth field effect transistors (106, 108) of a second channel type that is different from the first channel type. A set of voltage dividers (110, 112, 114, 116, 118, 120, 122, 124) and voltage clamping devices (126, 128, 130, 132) permit the circuit (400) to efficiently operate over a wider range of input voltages, without potential damage to the field effect transistors. Shoot-through protection devices (420, 430) provide a means for preventing the first and second field effect transistors (102, 104) from conducting simultaneously. Shoot-through protection devices (440, 450) provide a means for preventing the third and fourth field effect transistors (106, 108) from conducting simultaneously.

22 Claims, 5 Drawing Sheets

LOW-LOSS RECTIFIER WITH SHOOT-THROUGH CURRENT PROTECTION

STATEMENT REGARDING FEDERALLY SPONSORED RESEARCH OR DEVELOPMENT

This invention was made with government support. The government has certain rights in the invention.

BACKGROUND OF THE INVENTION

1. Statement of the Technical Field

The inventive arrangements relate to MOSFET circuits, and more particularly to a circuit for AC voltage rectification and shoot-through current protection.

2. Description of the Related Art

Bridge rectifier type devices are typically used to convert an AC waveform into a DC waveform. Such bridge rectifier type devices often utilize diode components to perform the rectification function. After an AC signal is rectified, the output signal is often filtered to remove unwanted spectral content and to produce a DC voltage. A filtering device utilizing capacitor components, resistor components, and/or inductor components are typically used for this purpose.

Despite the various technologies known in the art, there remains a need for a MOSFET bridge rectifier type device that can rectify a domestic AC mains (for example, 120V, 60 Hz) and/or a foreign AC mains (for example, 230V, 50 Hz) with low power loss. However, rectification of an AC mains signal with a MOSFET type bridge rectifier can create potentially damaging current spikes in an input current. For example, a shoot-through current may result at a zero crossing of an input voltage. The shoot-through current can occur when MOSFETs conduct simultaneously during transitions. The shoot-through current can produce a current spike through the drain of each MOSFET component. This current spike causes a relatively large amount of stress on the MOSFET devices. As a result, at least one of the simultaneously conducting MOSFETs can be damaged. In this regard, a MOSFET bridge rectifier type device is also needed with a shoot-through protection circuit to eliminate the amount of stress on the MOSFET devices during transitions.

SUMMARY OF THE INVENTION

The invention concerns a transistor active bridge circuit. The transistor active bridge circuit rectifies domestic AC mains (for example, 120V, 60 Hz) and/or foreign AC mains (for example, 230V, 50 Hz) with low power loss. The circuit is connectable between a pair of input lines and a pair of output lines. The transistor active bridge circuit includes first and second field effect transistors of a first channel type. A source-drain path of the first field effect transistor is connected in series with a source-drain path of the second field effect transistor. The series connected transistor pair form a first series transistor combination that is connected across the input lines. The transistor active bridge circuit also includes third and fourth field effect transistors of a second channel type, different from the first channel type. A source-drain path of the third field effect transistor is connected in series with a source-drain path of the fourth field effect transistor to form a second series transistor combination connected across the input lines. A first one of the output lines can be connected to the first series combination at an interconnection point between the first and the second field effect transistors. A second one of the output lines can be connected to the second series combination at an interconnection point between the third and fourth field effect transistors.

A voltage divider circuit is provided for each of the field effect transistors. The voltage divider circuit can be comprised of a first resistor and a second resistor. The first and second resistors are connected in series from a source of each field effect transistor to one of the input lines. A bias voltage tap is provided at a connection point between the first and second resistors. The bias voltage tap of each voltage divider is connected to a gate of each respective one of the field effect transistors. According to one aspect of the invention, the drain of each one of the field effect transistors can be connected to a first one of the input lines, the source of each one of the field effect transistors can be connected to the first resistor, and the second resistor can be connected to a second one of the input lines.

Applying voltage to the active bridge circuit will cause current to flow through the forward biased body diodes of the field effect transistors. This current generates a voltage at the bias voltage tap when it flows through the voltage divider circuit. The voltage derived from the bias voltage tap is used for biasing each transistor to an "on" state in which current can flow between the drain and source. Turning on the field effect transistor shorts the body diode, leaving only a small resistance between the drain and source as current flows through a conductive channel formed by the transistor. The voltage divider circuit also ensures that the voltage between the gate and the source is reduced relative to the input voltage. This ensures operation of the transistor active bridge circuit over a wider range of input voltages without risk of damage to the transistors. In this regard, the transistor active bridge circuit can also include a zener diode connected between the gate and the source of each respective one of the field effect transistors. The zener diode can be provided to serve as a further means for ensuring that the voltage between the gate and source terminals is limited.

A shoot-through protection circuit is provided for each of the field effect transistors. The shoot-through protection circuit includes one or more active devices connected across a gate and a source of each of the field effect transistors. The active devices can be selected as depletion mode field effect transistors. A voltage divider circuit is provided for each of the depletion mode field effect transistors. The voltage divider circuit can be comprised of a third resistor and a fourth resistor. The third and fourth resistors are connected in series between the pair of input lines. The third and fourth resistors are connected to a gate of each depletion mode field effect transistor at a junction point forming a connection between the third and fourth resistors.

The shoot-through protection circuit can also include a zener diode connected between the gate and the source of each respective one of the depletion mode field effect transistors. The zener diode can be provided to serve as a means for ensuring that the voltage between the gate and source terminals of a depletion mode field effect transistor is limited.

The depletion mode field effect transistors connected between a gate and source of the first and second field effect transistors can be of the second channel type. The depletion mode field effect transistors connected between a gate and source of the third and fourth field effect transistors can be of the first channel type.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
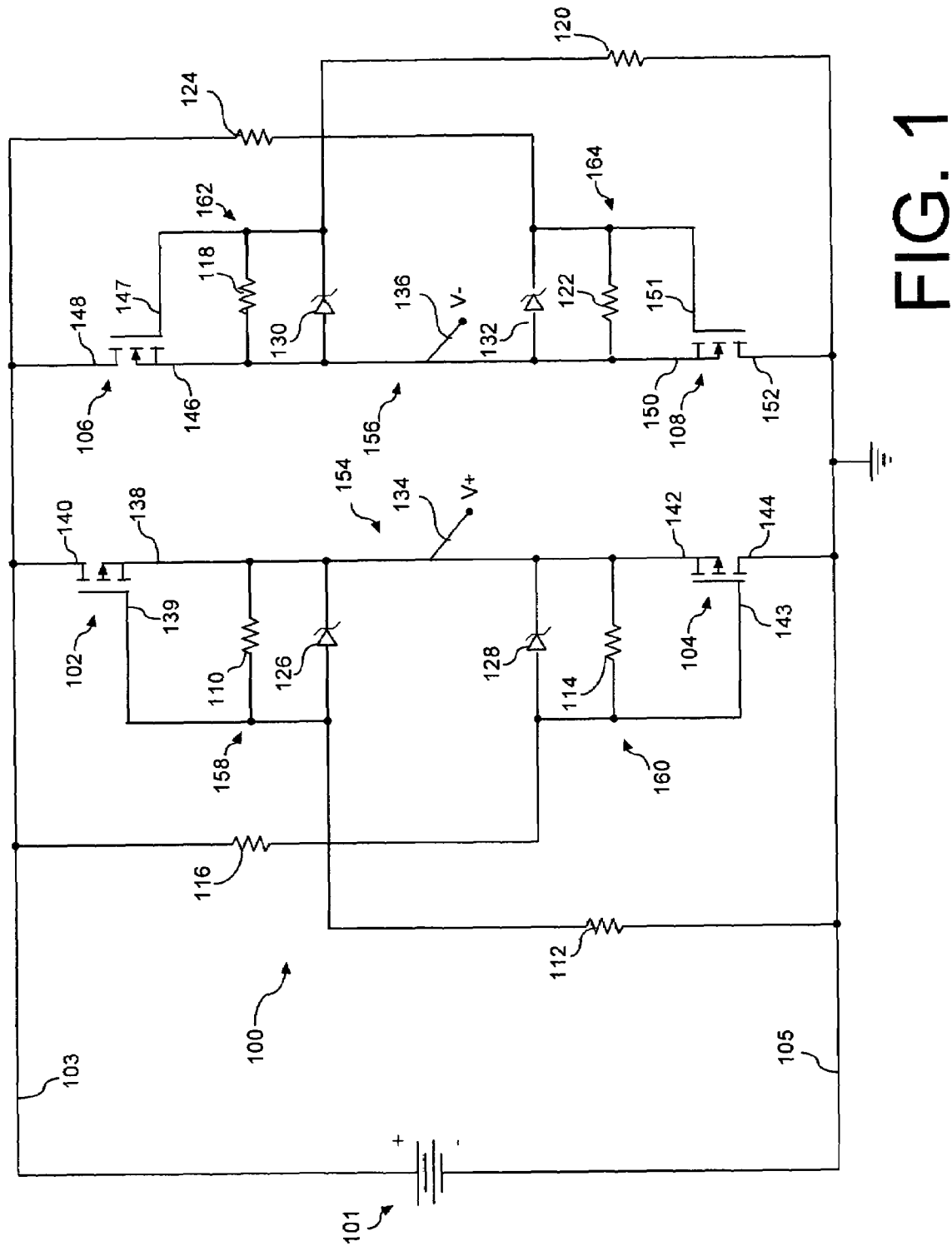
FIG. 1 is a schematic representation of a transistor active bridge circuit.

A transistor active bridge circuit 100 is shown in FIG. 1. The circuit 100 shown is useful for a variety of purposes, including rectification of domestic AC mains (for example, 120V, 60 Hz) and/or foreign AC mains (for example, 230V, 50 Hz) with low power loss. As may be observed in FIG. 1, circuit 100 is connectable between a pair of input lines 103, 105 and a pair of output lines 134, 136.

Circuit 100 includes first and second field effect transistors 102, 104 of a first channel type. The transistor active bridge circuit also includes third and fourth field effect transistors 106, 108 of a second channel type that is different from the first channel type. For example, the first and second field effect transistors 102, 104 can be P-channel type whereas the third and fourth field effect transistors 106, 108 can be N-channel type. Each of the field effect transistors can be enhancement mode devices. For example, the P-channel type transistor can be model number Si7431DP, which is available from Vishay Intertechnology, Inc. of Malvern, Pa. The N-channel device can be Si4490DY, which is also available from Vishay Intertechnology, Inc. Still, it should be understood that other types of field effect transistors can also be selected depending upon the anticipated voltage and current handling requirements of circuit 100.

Figures 2A, 2B:
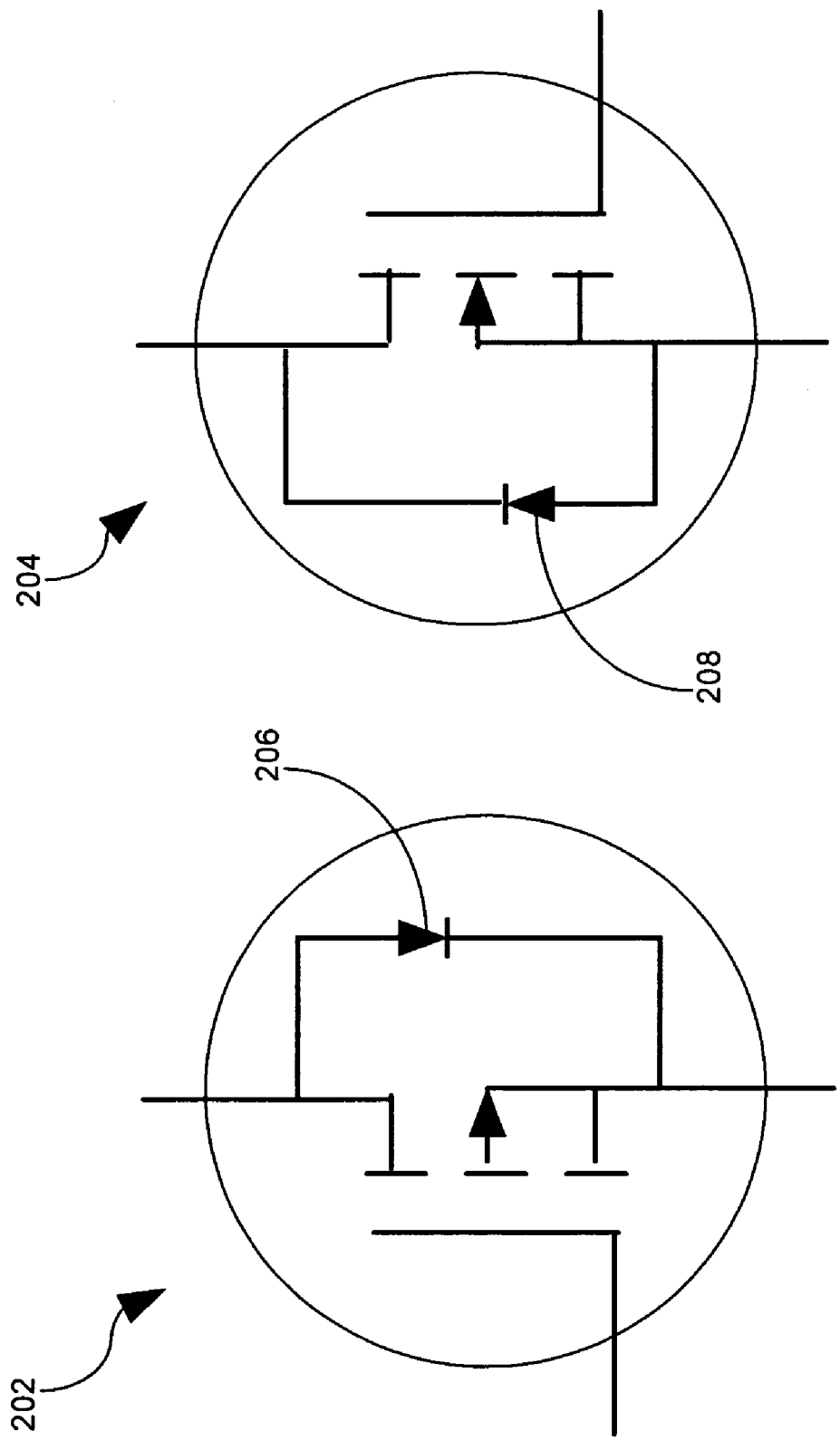
FIG. 2A and 2B are schematic representations of a MOSFET device showing an intrinsic body diode.

As will be understood by those skilled in the art, each of field effect transistor 102, 104, 106, 108 will have three terminals respectively defined as a source, gate and drain. With regard to field effect transistor 102, the source, gate and drain terminals are respectively identified with reference numbers 138, 139, and 140. With regard to field effect transistor 104, the source, gate and drain terminals are respectively identified with reference numbers 142, 143, and 144. The source gate and drain terminals of transistor 106 and 108 are respectively identified as 146, 147, 148 and 150, 151, 152. An electrical path can be provided from the source to the drain of each field effect transistor 102, 104, 106, and 108. This path is generally referred to herein as the source-drain path. Although not always shown in schematic illustrations, field effect transistor devices, such as MOSFETs typically have an intrinsic body diode that results from the manner in which the devices are manufactured. This intrinsic body diode 206, 208 is illustrated in FIGS. 2A and 2B for a P-channel 202 and N-channel device 204. The importance of this body diode will become clear in the discussion below regarding the detailed operation of the circuit.

Referring again to FIG. 1, it can be observed that a source-drain path of first field effect transistor 102 can be connected in series with a source-drain path of the second field effect transistor 104. The series connected transistor pair 102, 104 form a first series transistor combination that can be connected across the input lines 103, 105. A source-drain path of the third field effect transistor 106 can be connected in series with a source-drain path of the fourth field effect transistor 108 to form a second series transistor combination connected across the input lines 103, 105.

The circuit 100 can have an output defined by output lines 134, 136. A first one of the output lines 134 can be connected to the first series combination 102, 104 at an interconnection point 154 between the first and the second field effect transistors 102, 104. A second one of the output lines 136 can be connected to the second series combination 106, 108 at an interconnection point 156 between the third and fourth field effect transistors 106, 108.

A voltage divider circuit can be provided for each of the field effect transistors 102, 104, 106, 108. The voltage divider circuit can be comprised of a first resistor and a second resistor connected in series. However, those skilled in the art will appreciate that numerous different types of voltage dividers circuits are possible and can be used for the purposes as hereinafter described. The voltage divider circuit for the first field effect transistor 102 can include first resistor 110 and second resistor 112. The voltage divider circuit for the second field effect transistor 104 can include first resistor 114 and a second resistor 116. Similarly, the voltage divider circuit for the third and fourth field effect transistors 106, 108 can include first resistors 118, 122 and second resistors 120, 124.

In FIG. 1, the first and second resistors are connected in series from a source of each field effect transistor to one of the input lines. For example, the resistor combination 110, 112 is connected to source 138 of field effect transistor 102 to input line 105. The resistor combination 114, 116 is connected to source 142 of field effect transistor of 104 to input line 103. Each voltage divider advantageously provides a bias voltage tap 158, 160, 162, and 164. For example, if a resistive voltage divider is used as shown in FIG. 1, then the bias voltage tap can be provided at a connection point between the first and second resistors. The bias voltage tap 158, 160, 162, 164 of each voltage divider is connected to a gate 139, 143, 147, 151 of each respective one of the field effect transistors. Consequently, the bias voltage tap 158, 160, 162, 164 advantageously provides a substantially reduced voltage output relative to the input voltage applied to the voltage divider circuit 100 by power source 101. For example, the bias voltage tap of the voltage divider can provide an output that is reduced by 10% to 90% relative to the input voltage.

Notably, the transistor active bridge circuit 100 is not limited to any particular range of voltage reduction by the voltage divider. The purpose of the voltage divider is to permit a relatively larger range of input voltages to be applied across input lines 103, 105 without producing excessively high voltage levels between the gate and source of each field effect transistor. However, the voltage divider should still produce a bias voltage between each transistor gate 139, 143, 147, 151 and a respective source 138, 142, 146, 150 that is of sufficient magnitude to self bias each transistor for a predetermined range of input voltage applied across the input lines 103, 105. For example, the first resistor 110, 114, 118, 122 can be selected to be about 100 kΩ and the second resistor 112, 116, 120, 124 can be selected to be about 30 kΩ. This combination will provide a voltage reduction of about 23%. Still, those skilled in the art will appreciate that a variety of other voltage divider values can and should be used depending upon the design criteria for input voltage range and transistor specifications.

Circuit 100 can also include a voltage clamping circuit to ensure that the voltage applied, gate to source, across each of the field effect transistors does not become excessively large as the input voltage is increased. Any suitable voltage clamping circuit can be used for this purpose. For example, the voltage clamp could be simply implemented as a zener diode 126, 128, 130, 132 that is connected in parallel with first resistor 110, 114, 118, 122 between the gate and the source of each respective one of the field effect transistors 102, 104, 106, 108.

The zener diodes 126, 128, 130, 132 can ensure that the voltage between the gate and source terminals is limited. For example, the zener diode can prevent the voltage between the gate and source of each field effect transistor 102, 104, 106, 108 from exceeding a predetermined threshold voltage defined by the reverse breakdown voltage of the zener diode. A further advantage of using a voltage clamp as described herein is it allows adequate bias voltage levels to be developed between the gate 139, 143, 147, 151 and the source 138, 142, 146, 150, of each field effect transistor 102, 104, 106, 108, even with relatively low input voltages across lines 103, 105. For example, the voltage divider can be designed to allow a relatively large proportion of the input voltage (e.g. 70%) to appear at bias voltage tap 158, 160, 162, 164. The larger proportion of voltage ensures that the field effect transistors will be biased to their on state, even with relatively low input voltages from power source 101. In order to ensure that this larger proportion of voltage does not damage the field effect transistors when considerably higher input voltages are applied to the circuit 100, the clamping circuit (zener diode 126, 128, 130, 132 in FIG. 1) can clamp the output of the voltage divider at a predetermined level.

The operation of the circuit 100 will now be described in greater detail. When input line 103 is positive relative to input line 105, an intrinsic body diode associated with each of the field effect transistors 102 and 108 will be forward biased and current will begin to flow between the drain and source of these devices. This will produce a voltage at bias voltage tap 158, 164 as current begins to flow through the voltage divider circuits associated with the respective field effect transistors 102, 108. The voltage produced at the voltage tap 158, 164 can be used to self bias the field effect transistors 102, 108, thereby switching these transistors to their "on" state. When switched to their on state, a relatively low resistance path is created between drain 140, 152 and source 138, 150 of field effect transistors 102, 108. The exact amount of this resistance will depend upon several factors, including the specified drain-source on state resistance of the field effect transistors. For example "on" state resistance values of between 0.5 mΩ and 10Ω are typical for such devices. Generally P channel devices have a slightly higher resistance as compared to N channel devices. Once turned on, however, current will continue to flow between the drain and source of transistors 102, 108 through the low resistance path, thereby eliminating the voltage drop associated with the body diode. Consequently, if a load is connected across output lines 134, 136 the voltage drop caused by the bridge circuit can be considerably less than the typical diode drop associated with a conventional diode bridge. In this regard, it may be noted that in a conventional diode bridge circuit, the output voltage drop will include two diode drops. Accordingly, the voltage drop in a conventional diode bridge can be in the range from 1.2V to 1.6V or more.

If the input voltage applied across input lines 103, 105 is sufficiently high, it will exceed a reverse breakdown voltage of zener diodes 126, 132. This will cause the zener diodes to clamp the voltage applied across the gate to source terminals of each field effect transistor 102, 108. When the input voltage polarity is reversed, field effect transistors 102, 108 will be switched off, and field effect transistors 104, 106 will turn on in a manner similar to that described above.

Figure 3:
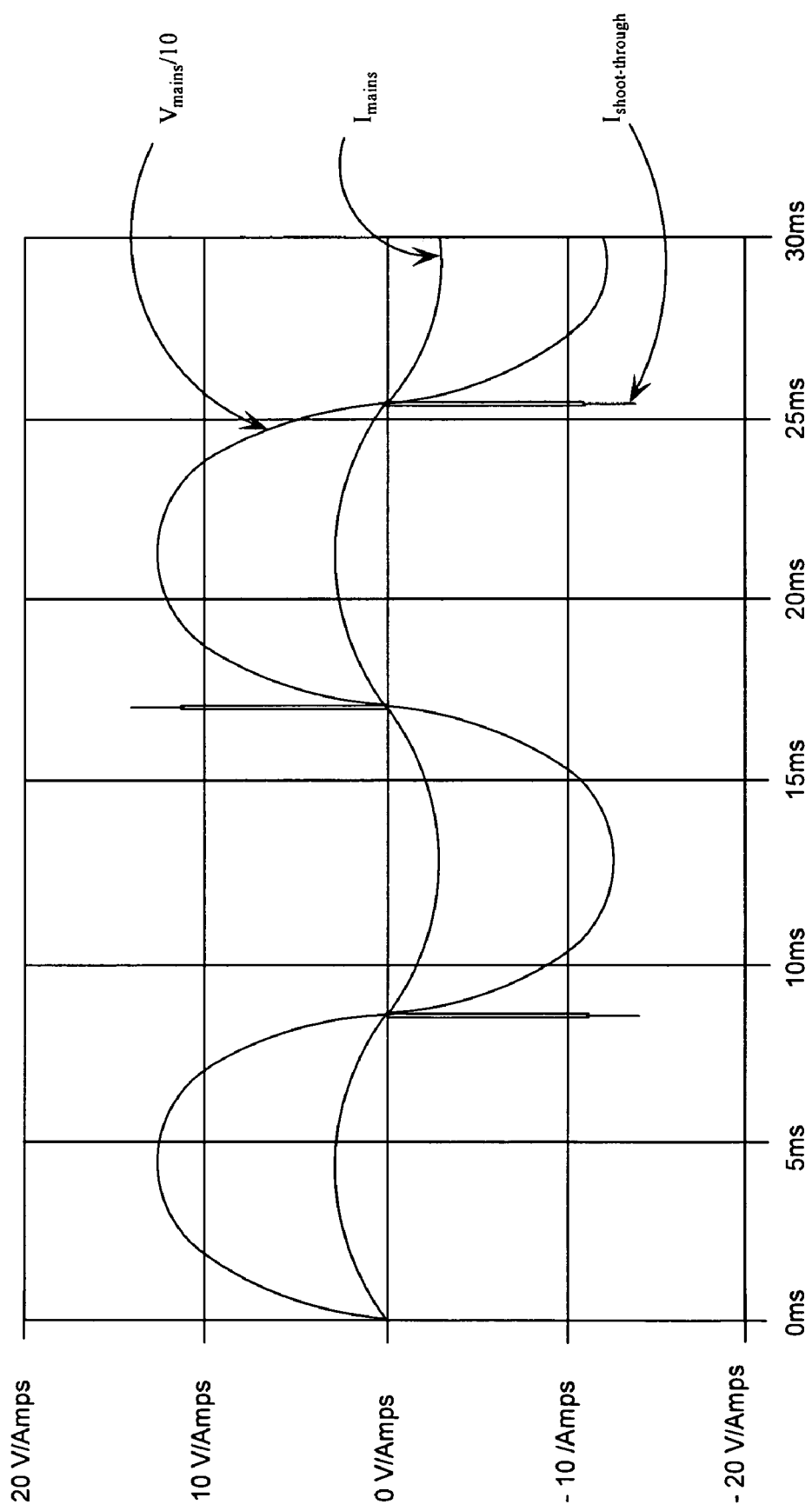
FIG. 3 is a time graph showing a shoot-through current resulting at an input voltage zero crossing.

Referring now to FIG. 3, a time graph is provided that shows a shoot-through current resulting at a zero crossing of an input voltage ($V_{mains}$) and an input current ($I_{mains}$) applied by an external power source. The shoot-through current can occur when field effect transistors 102, 104 or 106, 108 conduct simultaneously. For example, a large transient shoot-through current can flow directly from the external power source connected to input lines 103, 105 when field effect transistor 104 is biased to its "on" state (i.e., conducting state) before field effect transistor 102 has fully transitioned into a state of cutoff (i.e., non-conducting state). It should be appreciated that this can occur as a result of a field effect transistor's parasitic capacitance discharging through the bias network. In such a scenario, a short circuit is created across the input lines 103, 105 between the source-drain paths of field effect transistors 102, 104. As a result, at least one of the simultaneously conducting field effect transistors 102, 104 may be damaged, a fuse can be blown, a breaker can be tripped, and/or an external power source can experience an overload. Therefore, a shoot-through protection circuit is needed to prevent field effect transistors 102, 104 and 106, 108 from conducting simultaneously during transitions. Such a circuit is shown in FIG. 4.

Figure 4:
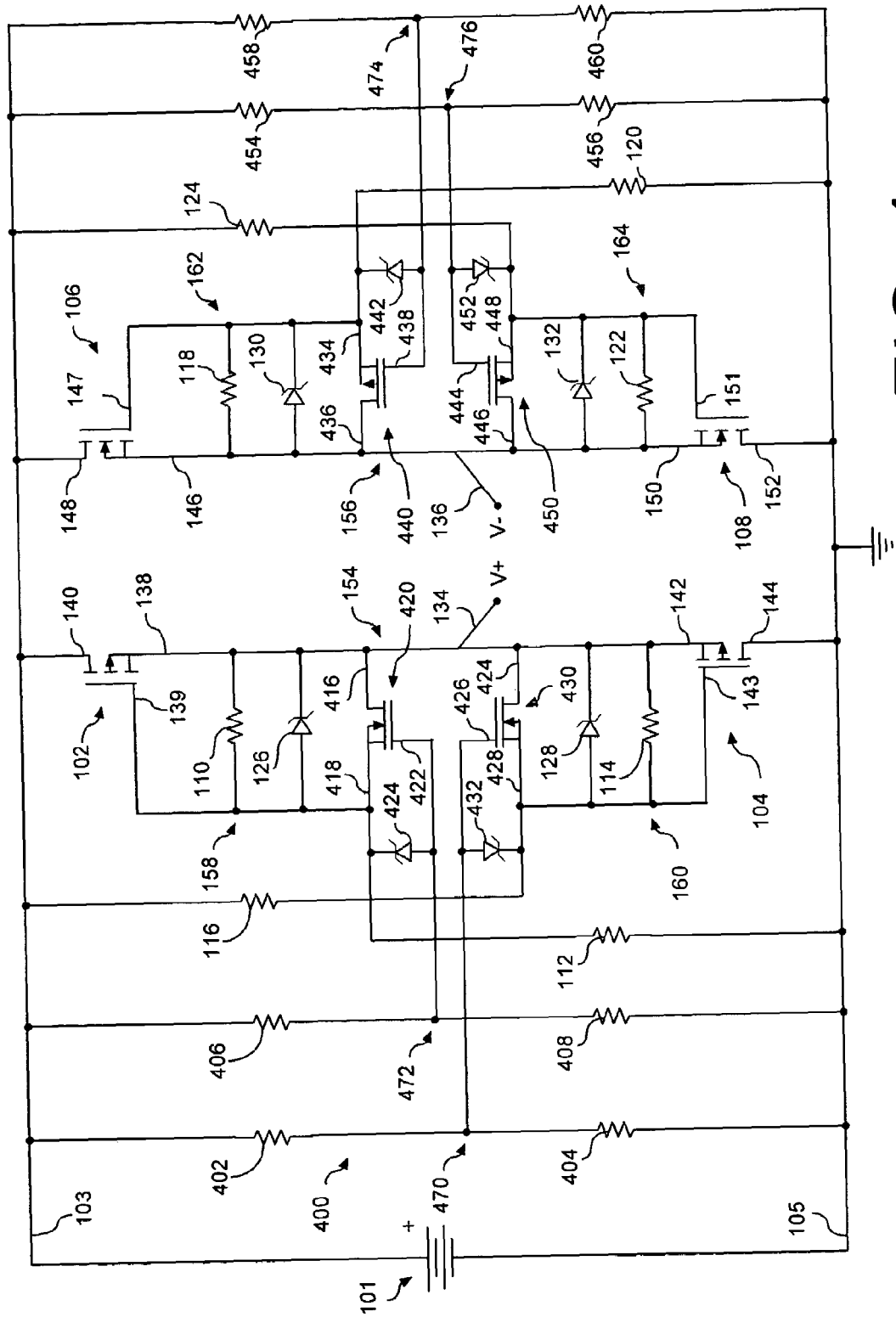
FIG. 4 is a schematic representation of a transistor active bridge circuit with shoot-through current protection.

A transistor active bridge circuit 400 with shoot-through current protection is shown in FIG. 4. The components of transistor active bridge circuit 400 are generally similar to those of transistor active bridge circuit 100, and thus, the description above will suffice with respect to the similar components. In addition, transistor active bridge circuit 400 includes a shoot-through protection circuit for each field effect transistor 102, 104, 106, 108.

According to an embodiment of the invention, the shoot-through protection circuit can be comprised of a field effect transistor. However, the invention is not limited in this regard. Instead, those skilled in the art will appreciate that numerous different types of shoot-through protection circuits are possible and can be used for the purposes as hereinafter described. The shoot-through protection circuits for field effect transistors 106, 108 can include a first channel type field effect transistor. The shoot-through protection circuits for field effect transistors 102, 104 can include a second channel type field effect transistor. The field effect transistors 420, 430 can be N-channel type whereas the field effect transistors 440, 450 can be P-channel type. Each of the field effect transistors 420, 430, 440, 450 can be depletion mode devices. Still, it should be understood that the invention is not limited in this regard.

As will be understood by those skilled in the art, each field effect transistor 420, 430, 440, 450 will have three terminals respectively defined as a source, gate and drain. With regard to field effect transistor 420, the source, gate and drain terminals are respectively identified with reference numbers 418, 422, and 416. With regard to field effect transistor 430, the source, gate and drain terminals are respectively identified with reference numbers 428, 426, and 424. With regard to field effect transistor 440, the source, gate and drain-terminals are respectively identified with reference numbers 434, 438, and 436. With regard to field effect transistor 450, the source, gate and drain terminals are respectively identified with reference numbers 448, 444, and 446. An electrical path can be provided between the source and the drain of each field effect transistor 420, 430, 440, 450, herein after referred to as the source-drain paths.

Referring again to FIG. 4, it can be observed that a source-drain path of field effect transistors 420, 430, 440, 450 is connected in parallel with each respective one of the resistors 110, 114, 118, 122 and zener diodes 126, 128, 130, 132. The source-drain path of field effect transistors 420, 430, 440, 450 can also be connected between the gate and source of each respective one of the field effect transistors 102, 104, 106, 108. Field effect transistor 420 ensures that field effect transistor 102 has fully transitioned into a cutoff state (i.e., a non-conducting state) before field effect transistor 104 is biased to its "on" state (i.e., a conducting state). For example, field effect transistor 420 shorts field effect transistor's 102 gate 139 to source 138 when the bias voltage between field effect transistor's 420 gate 422 and source 418 reaches a sufficiently low value (e.g., less than one volt above the zero crossing). It should be appreciated that depletion mode field effect transistor 420 is a normally-on device (the opposite of the enhanced mode effect transistor 102) and will cease to conduct drain-to-source when a sufficiently high voltage is applied gate to source. In such a scenario, field effect transistor 420 will be biased to it's "on" state and current will begin to flow between the source and drain of this device. In effect, field effect transistor 420 will act like a closed switch. When this occurs, field effect transistor 102 turns "off." In this regard, the conduction path between the field effect transistor's 102 source 138 and drain 140 goes away, but the field effect transistor's 102 body diode path remains. Similarly, field effect transistor 450 can ensure that field effect transistor 108 has fully transitioned into a cutoff state before transistor 106 is biased to its "on" state. Field effect transistor 430 can ensure that field effect transistor 104 has fully transitioned into a non-conducting state before field effect transistor 102 is biased to its "on" state. Likewise, field effect transistor 440 can ensure that field effect transistor 106 has fully transitioned into it's "off" state before field effect transistor 108 is biased to its "on" state.

A voltage divider circuit can be provided for each of the field effect transistors 420, 430, 440, 450. According to one embodiment of the invention, the voltage divider circuit for each field effect transistor 420, 430, 440, 450 can be comprised of a third resistor and a fourth resistor connected in series. However, the invention is not limited in this regard. Instead, those skilled in the art will appreciate that numerous different types of voltage dividers circuits are possible and can be used for the purposes as hereinafter described. The voltage divider circuit for the first field effect transistor 420 can include resistor 406 and resistor 408. The voltage divider circuit for the second field effect transistor 430 can include resistor 402 and resistor 404. Similarly, the voltage divider circuit for the third and fourth field effect transistors 440, 450 can include resistors 458, 460 and resistors 454, 456, respectively.

In FIG. 4, the third and fourth resistors are connected in series from input line 103 to input line 105. For example, resistor 402 is connected to input line 103 and resistor 404 is connected to input line 105. Each voltage divider advantageously provides a bias voltage tap 472, 470, 474, and 476. For example, if a resistive voltage divider is used as shown in FIG. 4, then the bias voltage tap can be provided at a connection point between the third and fourth resistors. The bias voltage tap 472, 470, 474, 476 of each voltage divider is connected to a gate of each respective one of the field effect transistors 420, 430, 440, 450. Consequently, the bias voltage tap 472, 470, 474, 476 advantageously provides a reduced voltage output relative to the input voltage applied to the voltage divider circuit by power source 101.

Notably, the invention is not limited to any particular range of voltage reduction by the voltage divider. A purpose of the voltage divider is to permit a relatively larger range of input voltages to be applied across input lines 103, 105 without producing excessively high voltage levels between the gate and source of each field effect transistor 420, 430, 440, 450. However, the voltage divider should still produce a bias voltage between each field effect transistor gate 422, 426, 438, 444 and a respective source 418, 428, 434, 448 that is of sufficient magnitude to self bias each field effect transistor for a predetermined range of input voltages applied across the input lines 103, 105. According to one embodiment, resistors 404, 406, 456, 458 can be selected to be about 100 kΩ and resistors 402, 408, 454, 460 can be selected to be about 1 kΩ. Still, those skilled in the art will appreciate that the invention is not limited in this regard. A variety of other voltage divider values can and should be used depending upon the design criteria for input voltage range and transistor specifications.

A voltage clamping circuit can be provided for each of the field effect transistors 420, 430, 440, 450. According to one embodiment of the invention, the voltage clamping circuit can be comprised of a zener diode 424, 432, 442, 452 that is connected between the source and gate of each respective one of the field effect transistors 420, 430, 440, 450. The zener diodes 424, 432, 442, 452 can ensure that the voltage between the gate and source terminals is limited. For example, the zener diode can prevent the voltage between the gate and source of each field effect transistor 420, 430, 440, 450 from exceeding a predetermined threshold voltage defined by the reverse breakdown voltage of the zener diode.

The operation of the circuit 400 will now be described in greater detail. When input line 103 is positive relative to input line 105, an intrinsic body diode associated with each of the field effect transistors 102 and 108 will be forward biased and current will begin to flow between the drain and source of these devices. This will produce a voltage at bias voltage tap 158, 164 as current begins to flow through the voltage divider circuits associated with the respective field effect transistors 102, 108. The voltage produced at the voltage tap 158, 164 can be used to self bias the field effect transistors 102, 108, thereby switching these transistors to their "on" state. When switched to their "on" state, a relatively low resistance path is created between drain 140, 152 and source 138, 150 of field effect transistors 102, 108. The exact amount of this resistance will depend upon several factors, including the specified drain-source "on" state resistance of the field effect transistors. For example, "on" state resistance values of between 0.5 mΩ and 10Ω are typical for such devices. Generally, P channel devices have a slightly higher resistance as compared to N channel devices. Once turned on, however, current will continue to flow between the drain and source of transistors 102, 108 through the low resistance path, thereby eliminating the voltage drop associated with the body diode. Consequently, if a load is connected across output lines 134, 136 the voltage drop caused by the bridge circuit can be considerably less than the typical diode drop associated with a conventional diode bridge. In this regard, it may be noted that in a conventional diode bridge circuit, the output voltage drop will include two diode drops. Accordingly, the voltage drop in a conventional diode bridge can be in the range from 1.2V to 1.6V.

If the input voltage applied across input lines 103, 105 is sufficiently high, it will exceed a reverse breakdown voltage of zener diodes 126, 132. This will cause the zener diodes to clamp the voltage applied across the gate to source terminals of each field effect transistor 102, 108.

If the bias voltage of each field effect transistor 420, 450 reaches a sufficiently low value (for example, less than one (1) volt above the zero crossing), each of the field effect transistors 420, 450 will be biased to it's "on" state and current will begin to flow between the source and drain of each device. In effect, each of the field effect transistors 420, 450 will act like a closed switch. When this occurs, the field effect transistors 102, 108 will turn "off." For example, the field effect transistors 420, 450 will short the gate and source terminals of the respective field effect transistors 102, 108 such that there is no conduction path between the field effect transistor's 102, 108 source 138, 150 and drain 140, 152, respectively.

If the input voltage applied across input lines 103, 105 is sufficiently high (for example, greater than twelve (12) volts above the zero crossing), it will exceed a reverse breakdown voltage of zener diodes 424, 452. This will cause the zener diodes to clamp the voltage applied across the gate to source terminals of each field effect transistor 420, 450.

When the input voltage polarity is reversed, field effect transistors 102, 108 will be switched off, and field effect transistors 104, 106 will turn on in a manner similar to that described above. Current will begin to flow between the drain and source of field effect transistors 104, 106. However, it should be understood that a very small amount of current (for example, a few micro amps) will flow through transistors 420, 450 while transistor active bridge circuit 400 is in this negative cycle. For example, the source of field effect transistor 420 is connected to input line 105 through resistor 112 (as shown in FIG. 4). In effect, the drain and source of field effect transistor 420 are at the same potential. As a result, a very small amount of current will flow between the drain and source of field effect transistor 420 during the negative cycle. In this regard, a large amount of current will flow from transistor 104 to a load connected across output lines 134, 136 and return through transistor 106. Similarly, the drain and source of field effect transistor 450 are at the same potential during the negative cycle. Accordingly, a very small amount of current will flow between the drain and source of field effect transistor 450.

Figure 5:
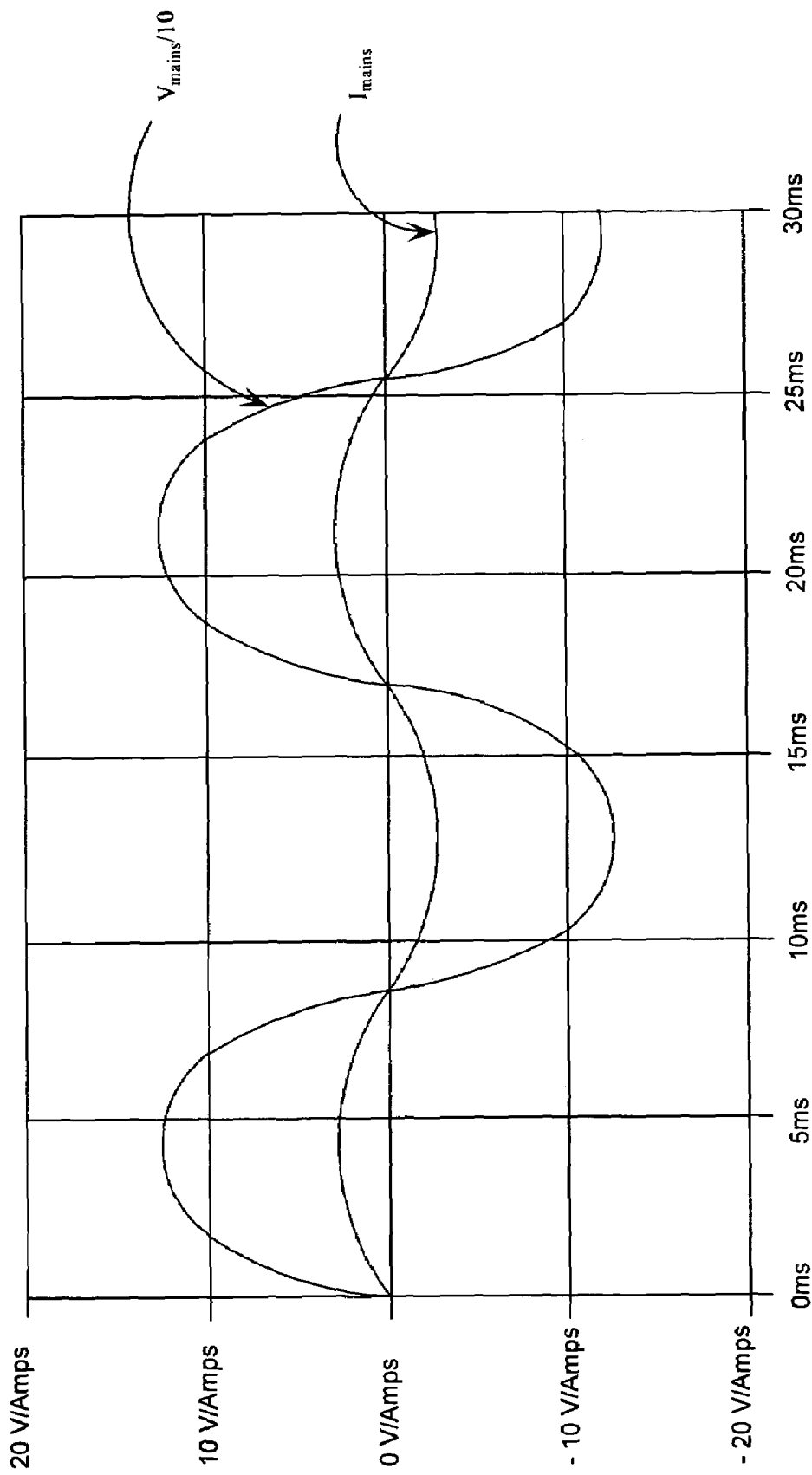
FIG. 5 is a time graph showing the elimination of the shoot-through current shown in FIG. 3.

FIG. 5 is a time graph plotting an input voltage and an input current to the transistor active bridge circuit 400. As shown in FIG. 5, the shoot-through current of FIG. 3 has been eliminated through the implementation of shoot-through protection devices 420, 430, 440, 450.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

I claim:

1. A transistor active bridge circuit connectable between a pair of input lines and a pair of output lines, comprising:
   first and second field effect transistors of a first channel type, a source-drain path of said first field effect transistor connected in series with a source-drain path of said second field effect transistor to form a first series transistor combination connected across said input lines;
   third and fourth field effect transistors of a second channel type, a source-drain path of said third field effect transistor connected in series with a source-drain path of said fourth field effect transistor to form a second series transistor combination connected across said input lines;
   a voltage divider provided for each of said field effect transistors, said voltage divider comprised of a first resistor and a second resistor connected in series from a source of each said field effect transistor to one of said input lines;
   a bias voltage tap defined at a connection point between said first and second resistors connected to a gate of each of said field effect transistors; and
   a shoot-through protection circuit comprising at least one active device connected across a gate and a source of each of said first, second, third, and fourth field effect transistors.

2. The transistor active bridge circuit of claim 1, further comprising a voltage clamping device connected between said gate and said source of each respective one of said field effect transistors.

3. The transistor active bridge circuit of claim 1, further comprising a first output line connected to said first series combination at an interconnection point between said first and said second field effect transistors, and a second output line connected so said second series combination at an interconnection point between said third and fourth field effect transistors.

4. The transistor active bridge circuit of claim 1, wherein a drain of each one of said field effect transistors is connected to a first one of said input lines, said source of each one of said field effect transistor is connected to said first resistor, and said second resistor is connected to a second one of said input lines.

5. The transistor active bridge circuit according to claim 1, wherein said first channel type is different from said second channel type.

6. The transistor active bridge circuit according to claim 1, wherein each of said field effect transistors is a MOSFET type device.

7. The transistor active bridge circuit according to claim 1, wherein said at least one active device is a depletion mode field effect transistor.

8. The transistor active bridge circuit according to claim 7, wherein said shoot-through protection circuit further comprises a voltage divider provided for said depletion mode field effect transistor, said voltage divider comprised of a third resistor and a fourth resistor connected to a gate of said depletion mode field effect transistor.

9. The transistor active bridge circuit according to claim 8, wherein said third and fourth resistors are connected in series between said input lines.

10. The transistor active bridge circuit according to claim 9, wherein said shoot-through protection circuit further comprises a zener diode connected between said gate and a source of said depletion mode field effect transistor.

11. The transistor active bridge circuit according to claim 1, wherein said at least one active device comprises fifth and sixth field effect transistors of said second channel type, a source-drain path of said fifth field effect transistor connected between a gate and source of said first field effect transistor, a source-drain path of said sixth field effect transistor connected between a gate and source of said second field effect transistor.

12. The transistor active bridge circuit according to claim 1, wherein said at least one active device comprises seventh and eighth field effect transistors of said first channel type, a source-drain path of said seventh field effect transistor connected between a gate and source of said third field effect transistor, a source-drain path of said eighth field effect transistor connected between a gate and source of said fourth field effect transistor.

13. A transistor active bridge circuit connectable between a pair of input lines and a pair of output lines, comprising:

first and second field effect transistors of a first channel type, a source-drain path of said first field effect transistor connected in series with a source-drain path of said second field effect transistor to form a first series transistor combination connected across said input lines;

third and fourth field effect transistors of a second channel type different from said first channel type, a source-drain path of said third field effect transistor connected in series with a source-drain path of said fourth field effect transistor to form a second series transistor combination connected across said input lines;

a voltage divider provided for each of said field effect transistors, said voltage divider connected in series from a source of each said field effect transistor to one of said input lines;

an output tap of each said voltage divider configured for providing an output voltage that is reduced relative to an input voltage applied to each said voltage divider, each said output tap respectively connected to a gate of each of said field effect transistors; and a shoot-through protection circuit means for preventing said first and second field effect transistors from simultaneously conducting and for preventing said third and fourth field effect transistors from simultaneously conducting.

14. A transistor active bridge circuit connectable between a pair of input lines and a pair of output lines, comprising:

a field effect transistor bridge rectifier circuit comprised of a plurality of field effect transistors;

a voltage divider provided for each of said plurality of field effect transistors, said voltage divider comprised of a first resistor and a second resistor connected in series from a source of each said field effect transistor to one of said input lines;

a bias voltage tap defined at a connection point between said first and second resistors connected to a gate of each of said field effect transistors; and a shoot-through protection circuit for each of said plurality of field effect transistors, said shoot-through protection circuit comprising at least one active device connected across a gate and a source of each of said plurality of field effect transistors.

15. The transistor active bridge circuit of claim 14, further comprising a zener diode connected between said gate and said source of each respective one of said field effect transistors.

16. The transistor active bridge circuit of claim 14, wherein said bridge rectifier circuit is comprised of first and second field effect transistors of a first channel type, and third and fourth field effect transistors of a second channel type; and wherein a source-drain path of said first field effect transistor is connected in series with a source-drain path of said second field effect transistor to form a first series transistor combination connected across said input lines, and a source-drain path of said third field effect transistor connected in series with a source-drain path of said fourth field effect transistor form a second series transistor combination connected across said input lines.

17. The transistor active bridge circuit of claim 16, wherein said at least one active device comprises a fifth and a sixth field effect transistors of said second channel type, and a seventh and eighth field effect transistors of said first channel type; and wherein a source-drain path of said fifth field effect transistor is connected between a gate and source of said first field effect transistor, a source-drain path of said sixth field effect transistor is connected between a gate and source of said second field effect transistor, a source-drain path of said seventh field effect transistor is connected between a gate and source of said third field effect transistor, and a source-drain path of said eighth field effect transistor is connected between a gate and source of said fourth field effect transistor.

18. The transistor active bridge circuit of claim 14, wherein a drain of each one of said field effect transistors is connected to a first one of said input lines, said source of each one of said field effect transistor is connected to said first resistor, and said second resistor is connected to a second one of said input lines.

19. The transistor active bridge circuit of claim 14, wherein said at least one active device is a depletion mode field effect transistor.

20. The transistor active bridge circuit of claim 19, wherein said shoot-through protection circuit further comprises a voltage divider provided for said depletion mode field effect transistor, said voltage divider comprised of a third resistor and a fourth resistor connected to a gate of said depletion mode effect transistor.

21. The transistor active bridge circuit of claim 20, wherein said third and fourth resistors are connected in series between said input lines.

22. The transistor active bridge circuit of claim 21, wherein said shoot-through protection circuit further comprises a zener diode connected between said gate and a source of said depletion mode field effect transistor.

\* \* \* \* \*